(12) United States Patent
Kobayashi et al.

(10) Patent No.: US 8,432,858 B2
(45) Date of Patent: Apr. 30, 2013

(54) RADIO NETWORK CONTROLLER AND CHANNEL ASSIGNMENT METHOD OF SIMPLIFYING AND CURTAILING THE CHANNEL SWITCHING TIME

(75) Inventors: Kazunari Kobayashi, Kawasaki (JP); Tomonori Kumagai, Kawasaki (JP); Daisuke Nitta, Kawasaki (JP); Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 999 days.

(21) Appl. No.: 11/492,942

(22) Filed: Jul. 26, 2006

(65) Prior Publication Data

US 2007/0217359 A1  Sep. 20, 2007

(30) Foreign Application Priority Data

Mar. 20, 2006 (JP) ................. 2006-076694

(51) Int. Cl.
*H04W 4/00* (2009.01)
(52) U.S. Cl.
USPC ........... 370/329; 370/322; 370/341; 370/332; 370/328; 370/338; 455/450; 455/453; 455/464; 455/509
(58) Field of Classification Search ....... 455/432.1–453, 455/455, 515, 516, 509, 464, 436–453, 434, 455/525, 435.1; 370/230–235, 338, 341–343, 370/348, 465, 335, 347, 431, 329–334, 322
See application file for complete search history.

(56) References Cited

U.S. PATENT DOCUMENTS

| | | | |
|---|---|---|---|
| 6,031,832 A | 2/2000 | Turina | |
| 6,507,567 B1 * | 1/2003 | Willars | 370/321 |
| 6,594,238 B1 * | 7/2003 | Wallentin et al. | 370/252 |
| 7,280,834 B2 * | 10/2007 | Takarabe | 455/450 |
| 7,453,854 B2 * | 11/2008 | Fujishima et al. | 370/335 |
| 2004/0235472 A1 | 11/2004 | Fujishima et al. | |

FOREIGN PATENT DOCUMENTS

| | | |
|---|---|---|
| CN | 1345518 A | 4/2002 |
| DE | 10331319 A1 | 2/2005 |
| EP | 1781057 A1 | 5/2007 |

(Continued)

OTHER PUBLICATIONS

Notification of Argument Submission issued in the corresponding Korean Patent Application No. 10-2007-0023449; Radio Network Controller and Channel Assignment Method by Same dated Mar. 13, 2008.

(Continued)

*Primary Examiner* — Vladimir Magloire
*Assistant Examiner* — Babar Sarwar
(74) *Attorney, Agent, or Firm* — Smith, Gambrell & Russell, LLP

(57) ABSTRACT

To provide a technique of making it possible to shorten a time taken by channel switching. Further, to provide a technique of enabling simplification of a channel switching procedure.

A radio network controller for assigning, to each wireless terminal connected to a wireless network, one of an individual channel exclusively used by the wireless terminal and a common channel shared with at least one wireless terminal different from the wireless terminal as a communication channel, includes: a determination portion for determining that an individual channel is to be assigned to a wireless terminal; and an assignment portion for, when the assignment of the individual channel has been determined, assigning an individual channel resource secured and held before the determination to the wireless terminal.

14 Claims, 11 Drawing Sheets

FOREIGN PATENT DOCUMENTS

| | | |
|---|---|---|
| JP | 09182152 | 7/1997 |
| JP | 11136754 | 5/1999 |
| JP | 2000-278327 | 10/2000 |
| JP | 2001505018 A | 4/2001 |
| JP | 2002542687 | 12/2002 |
| JP | 2006060624 | 3/2006 |
| KR | 2001-0108485 | 7/2001 |
| WO | 99/66748 A1 | 12/1999 |
| WO | 0062572 | 10/2000 |
| WO | WO 00/62572 A1 | 10/2000 |
| WO | 0131950 A1 | 5/2001 |

OTHER PUBLICATIONS

Office Action dated Nov. 20, 2009 received in corresponding Chinese Patent Application No. 200710088302.9.

Office Action dated Aug. 11, 2010 in corresponding Chinese Patent Application No. 200710088302.9.

Japanese Office Action dated Dec. 14, 2010 for application no. 2006-076694.

Notice of Final Decision of Rejection dated Mar. 8, 2011, issued in corresponding Japanese Patent Application No. 2006-076694.

Lucent Technologies: "Proposal for supporting Real Time services over HSDPA, R2-050915" 3GPP TSG-RAN2 Meeting 46BIS, Apr. 4, 2005, pp. 1-6 XP002368691.

Samsung: "Introducing preconfiguration upon radio bearer establishment, R2-051044" Internet Citation, Mar. 30, 2005, XP002375551, [retrieved on Apr. 4, 2006] Paragraph [02.1], [02.2].

European Search Report dated Apr. 20, 2011 received in application No. 06253757.6-1249/1838043.

Office Action dated Jun. 13, 2012 issued in the corresponding European Application No. 06 253 757.6-1249.

* cited by examiner

FIG. 5A

| USE STATE | BASE STATION NUMBER | CELL NUMBER | SCRAMBLE CODE |
|---|---|---|---|
| USER EQUIPMENT #1 | 1 | 1 | 36690 |
| UNUSED | 1 | 1 | 36690 |
| ⋮ | ⋮ | ⋮ | ⋮ |
| UNUSED | 2 | 10 | 29000 |

FIG. 5B

| USE STATE | BASE STATION NUMBER | CELL NUMBER | SCRAMBLE CODE | USE USER EQUIPMENT |
|---|---|---|---|---|
| USER EQUIPMENT #1 | 1 | 1 | 36690 | USER EQUIPMENT #1 |
| UNUSED | 1 | 1 | 36690 | USER EQUIPMENT #2 |
| ⋮ | ⋮ | ⋮ | ⋮ | ⋮ |
| UNUSED | 2 | 10 | 29000 | UNUSED |

RADIO NETWORK CONTROLLER AND CHANNEL ASSIGNMENT METHOD OF SIMPLIFYING AND CURTAILING THE CHANNEL SWITCHING TIME

BACKGROUND OF THE INVENTION

1. Technical Field

The present invention relates to a radio network controller and a channel assignment method by the apparatus and in particular relates to a method of channel switching in a wideband-CDMA (W-CDMA) system.

2. Background Art

In recent years, a code division multiple access (CDMA) communication system has been under rapid development. In addition to current main service based on voice and still images, commercializing service of a wideband CDMA system (W-CDMA) has also been started. Under such a situation, by the 3rd Generation Partnership Project (3GPP, http://www.3gpp.org/) that is a 3rd generation mobile communication system standardizing group, various specifications based on the W-CDMA system have been drawn up in order to realize a system in which it is possible to provide high-quality service.

The W-CDMA system mainly includes user equipments, base stations that terminate wireless sections, radio network controllers that control the base stations, and an exchange that manages the radio network controllers. As transmission lines between the base stations and the user equipments, wireless transmission lines are used, so there is a limitation on usable resources (frequencies). Further, the mobile communication system is required to be capable of placing as many user equipments as possible under a communicable state. Therefore, in the W-CDMA system, effective use of the limited wireless resources is achieved by using different channels that are individual channels and common channels having mutually different characteristics.

In the W-CDMA system, assignment of the individual channels and the common channels to the user equipments is changed as appropriate in accordance with communication rates desired by the user equipments and the amounts of data actually transferred between the radio network controllers and the user equipments so that the wireless resources are used with efficiency. This changing of the assignment of the individual channels and the common channels is referred to as "channel switching".

When consideration is given to the effective use of the wireless resources, it is required that this channel switching be carried out in a real-time manner in accordance with the data transfer rates between the radio network controllers and the user equipments. Therefore, capability of carrying out of the channel switching in short cycles and shortening of times taken by the channel switching as much as possible lead to an increase in communication quality.

[Patent document 1] JP 2001-505018 A
[Patent document 2] JP 2000-278327 A

SUMMARY OF THE INVENTION

Problems to be Solved by the Invention

Currently, the W-CDMA system operates as a system for making it possible to effectively use the wireless resources through channel switching control. When it is desired to further increase the efficiency of the use of the wireless resources from the current level, channel switching control in short cycles becomes necessary.

However, the channel switching control places large processing loads on devices (radio network controllers, base stations, user equipments) constituting the W-CDMA system. Further, a current procedure for the channel switching is a time consuming procedure. This is because when the channel switching is carried out, it is required to secure new resources for the radio network controllers and the base stations.

The W-CDMA system is adopted by many carriers. The number of users (number of user equipments) goes on increasing. This increase in the number of users arouses a fear that shortage of the wireless frequency resources will occur, and it is planned to take measures, such as expansion of a use frequency band, in the future.

It is obvious that under such circumstances, the channel switching control in short cycles is indispensable control and fine control in shorter cycles than before is required. In addition, it is also obvious that shortening of the processing time taken by the channel switching control and reduction of the processing loads on the network devices resulting from the control are important.

An object of the present invention is to provide a technique with which it becomes possible to shorten a time for establishing an individual channel for a wireless terminal.

Further, another object of the present invention is to provide a technique of making it possible to shorten a time taken by channel switching.

Further, still another object of the present invention is to provide a technique of enabling simplification of a channel switching procedure.

Means for Solving the Problems

To solve the problems, the present invention adopts the following means. That is, an aspect of the present invention relates to a radio network controller for assigning, to each wireless terminal connected to a wireless network, one of an individual channel exclusively used by the wireless terminal and a common channel shared with at least one wireless terminal different from the wireless terminal as a communication channel, the radio network controller including:

a determination portion for determining that an individual channel is to be assigned to a wireless terminal; and an assignment portion for, when the assignment of the individual channel has been determined, assigning an individual channel resource secured and held before the determination to the wireless terminal.

With this construction, an individual channel resource secured and held before determination of individual channel assignment is assigned, so no individual channel resource securement time is required after the determination. Consequently, it becomes possible to shorten a time taken by the assignment.

Further, in the aspect of the present invention, when the determination portion has determined that a communication channel used by a wireless terminal is to be switched from a common channel to an individual channel, the assignment portion is capable of being configured to assign an individual channel resource secured and held before the determination of the switching to the wireless terminal.

With this construction, an individual channel resource secured before determination of individual channel assignment is assigned, so no individual channel resource securement time is required after the determination. Consequently, it becomes possible to shorten a time taken by channel switching. Further, it becomes possible to appropriately comply with a communication rate necessary for a wireless terminal and achieve an improvement in communication quality.

Further, in the aspect of the present invention, further including a storage portion for storing identification information of each individual channel resource secured before the determination by the determination portion and a use state thereof, the assignment portion is also capable of finding an unused individual channel resource from the storage portion and assigning the found individual channel resource to a wireless terminal.

Further, in the aspect of the present invention, it is possible to further include a securement portion for securing an individual channel resource for assigning an individual channel to a wireless terminal even when there exists no wireless terminal to which the individual channel should be assigned.

Further, in the aspect of the present invention, the securement portion is also capable of securing the individual channel resource at the time of activation of the radio network controller.

With this construction, individual channel resource securement is performed before communication with a wireless terminal at the time of activation is started, so it becomes possible to achieve a reduction in processing load.

Further, in the aspect of the present invention, when switching from an individual channel to a common channel has been carried out for a certain wireless terminal, the securement portion is also capable of securing an individual channel resource used by the certain wireless terminal without releasing the individual channel resource.

With this construction, an individual channel resource is secured without releasing the individual channel resource, so it becomes possible to achieve a reduction of labor in a securement procedure (reduce the number of times of execution of the securement procedure).

Further, in the aspect of the present invention, further including a storage portion for storing the certain wireless terminal and the individual channel resource used by the certain wireless terminal in association with each other, when the determination portion determines that a communication channel used by the certain wireless terminal is to be switched from a common channel to an individual channel again, the assignment portion is also capable of referring to the storage portion and assigning the individual channel resource originally used by the certain wireless terminal.

With this construction, it becomes unnecessary to conduct an individual channel search again, so it becomes possible to determine an individual channel resource that should be assigned to a wireless terminal without delay. Further, it becomes possible to shorten a processing procedure.

Further, in the aspect of the present invention, the individual channel resource used by the certain wireless terminal is also capable of being released when the certain wireless terminal moves to a wireless area that is different from a wireless area in which the certain wireless terminal is capable of using the individual channel resource.

With this construction, it becomes possible to achieve effective use of resources by releasing each individual channel resource that is considered unnecessary.

Further, in the aspect of the present invention, at the time of outgoing from a wireless terminal or incoming to the wireless terminal, when the determination portion determines that an individual channel is to be assigned to the wireless terminal that is an outgoing terminal or an incoming terminal, the assignment portion is also capable of assigning an individual channel resource secured and held before the determination to the wireless terminal.

With this construction, it becomes possible to shorten a channel establishment procedure at the time of outgoing and at the time of incoming.

The "wireless terminals" in the present invention include mobile communication devices such as portable telephones.

Further, it is possible to implement the present invention as a channel assignment method by a radio network controller having the same features as the radio network controller according to the present invention, a program for causing an information processing apparatus (computer or the like) to function as the radio network controller, or a storage medium recording the program.

Effects of the Invention

According to the present invention, it becomes possible to provide a technique with which it becomes possible to shorten a time for establishing an individual channel for a wireless terminal.

Further, according to the present invention, it becomes possible to provide a technique of making it possible to shorten a time taken by channel switching.

Further, according to the present invention, it becomes possible to provide a technique of enabling simplification of a channel switching procedure.

BEST MODE OF CARRYING OUT THE INVENTION

Hereinafter, an embodiment of the present invention will be described with reference to the drawings. A construction in the embodiment is merely an example and the present invention is not limited to the construction in the embodiment.

BRIEF DESCRIPTION OF THE DRAWINGS

FIG. 5A is a diagram showing an example of an individual channel management table in the radio network controller.

FIG. 5B is a diagram showing an example of the individual channel management table in the radio network controller.

DETAILED DESCRIPTION OF THE INVENTION

Embodiment

System Configuration

Figure 1:
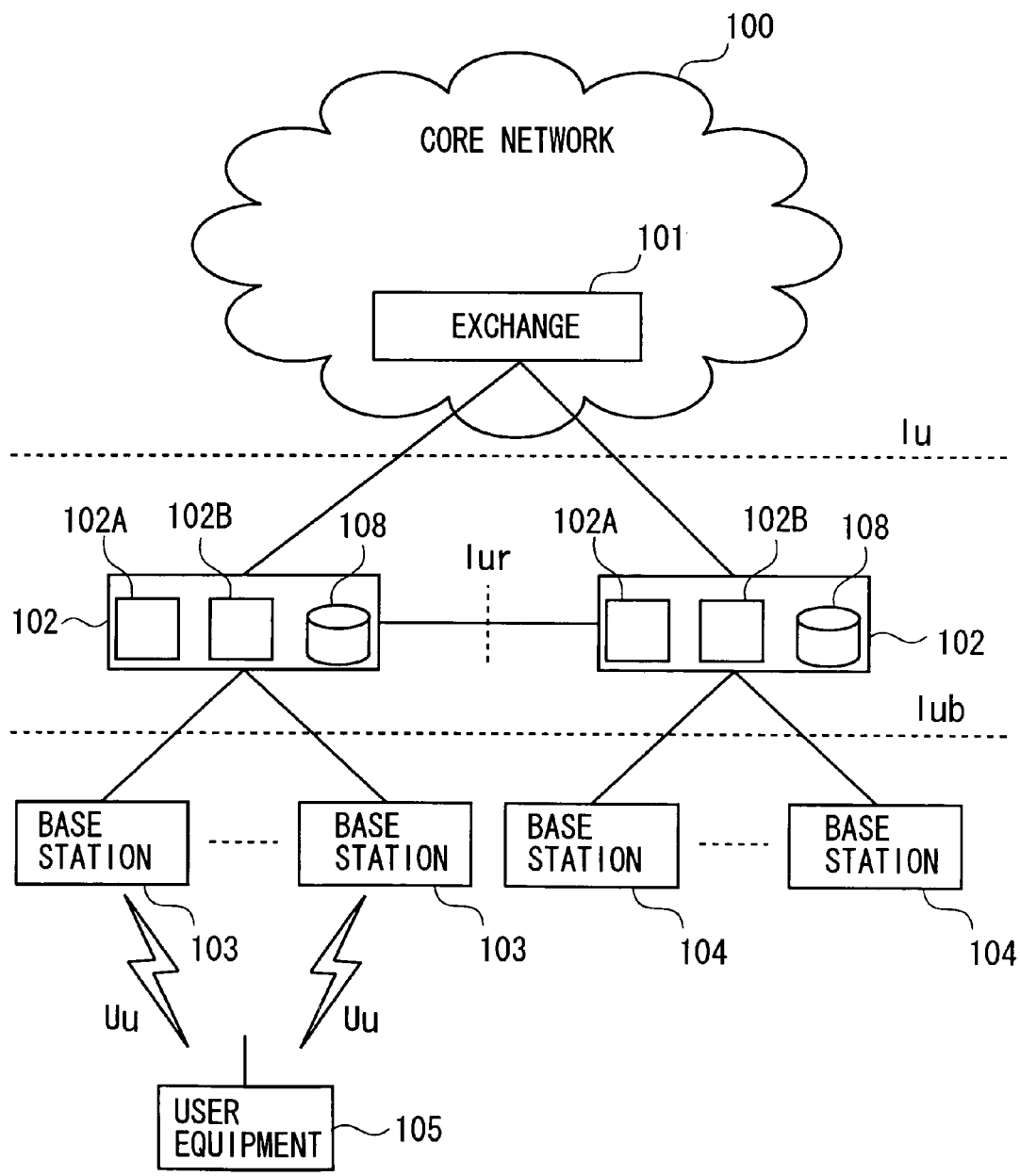
FIG. 1 is a diagram showing an outline of a W-CDMA system.

FIG. 1 shows a configuration example of a W-CDMA system. In the example shown in FIG. 1, the W-CDMA system includes a user equipment 105, base stations 103 that terminate wireless sections with the user equipment 105, radio network controllers 102 that each accommodate the multiple base stations 103 and control each base station 103, and an exchange 101 that manages the multiple radio network controllers 102, and is connected to a core network 100 through the exchange 101. An interface between the radio network controllers 102 and the exchange 101 is referred to as "Iu". An interface that establishes connection between the radio network controllers 102 is referred to as "Iur". An interface between the radio network controllers 102 and the base stations 103 is referred to as "Iub". An interface between the base stations 103 and the user equipment 105 is referred to as "Uu".

Connection between the radio network controllers 102 and the base stations 103 is established with wired transmission lines in ordinary cases. Note that there is also a case where the connection therebetween is established with wireless transmission lines. The base stations 103 and the user equipment 105 are connected with each other through wireless transmission lines.

Each radio network controller 102 includes a channel switching judgment portion 102A, a channel switching control portion 102B, and a storage portion 108.

When the user equipment 105 performs communication by connecting to the base station 103, the wireless network control portion 102 assigns a communication channel to be used in the communication to the user equipment 105 through cooperation with the base station 103. That is, prior to communication by the user equipment 105, from the user equipment 105 to the radio network controller 102, a communication channel to be used by the user equipment 105 is established.

As the communication channel, there are an individual channel, whose band is exclusively usable by the user equipment 105, and a common channel whose band is shared among multiple user equipments 105 connected to the base station 103. Further, as the communication channel, there are a transport channel established between the radio network controller 102 and the base station 103 and a physical channel established between the base station 103 and the user equipment 105.

The channel switching judgment portion 102A judges whether it is required to perform channel switching from a common channel to an individual channel or from an individual channel to a common channel for the user equipment 105 in accordance with the amount of communication between the user equipment 105 and the radio network controller 102.

The channel switching control portion 102B performs channel switching from a common channel to an individual channel or from an individual channel to a common channel.

The storage portion 108 stores a table (FIGS. 5A and 5B) for managing the communication channel among the radio network controller 102, the base station 103, and the user equipment 105. The radio network controller 102 further establishes a communication channel with the exchange 101 and a communication channel via the core network 100 is established between the exchange 101 and a user equipment of the other party (or terminal of the other party). The user equipment 105 is capable of performing communication with the terminal of the other party using the established communication channels.

The base station 103 executes an establishment procedure (connection procedure) for establishing the communication channel in a wireless section with the user equipment 105 and relays communication between the user equipment 105 and the radio network controller 102. The base station 103 accommodates multiple cells.

The user equipment 105 performs communication using a common channel or an individual channel assigned to itself.

Figure 2:
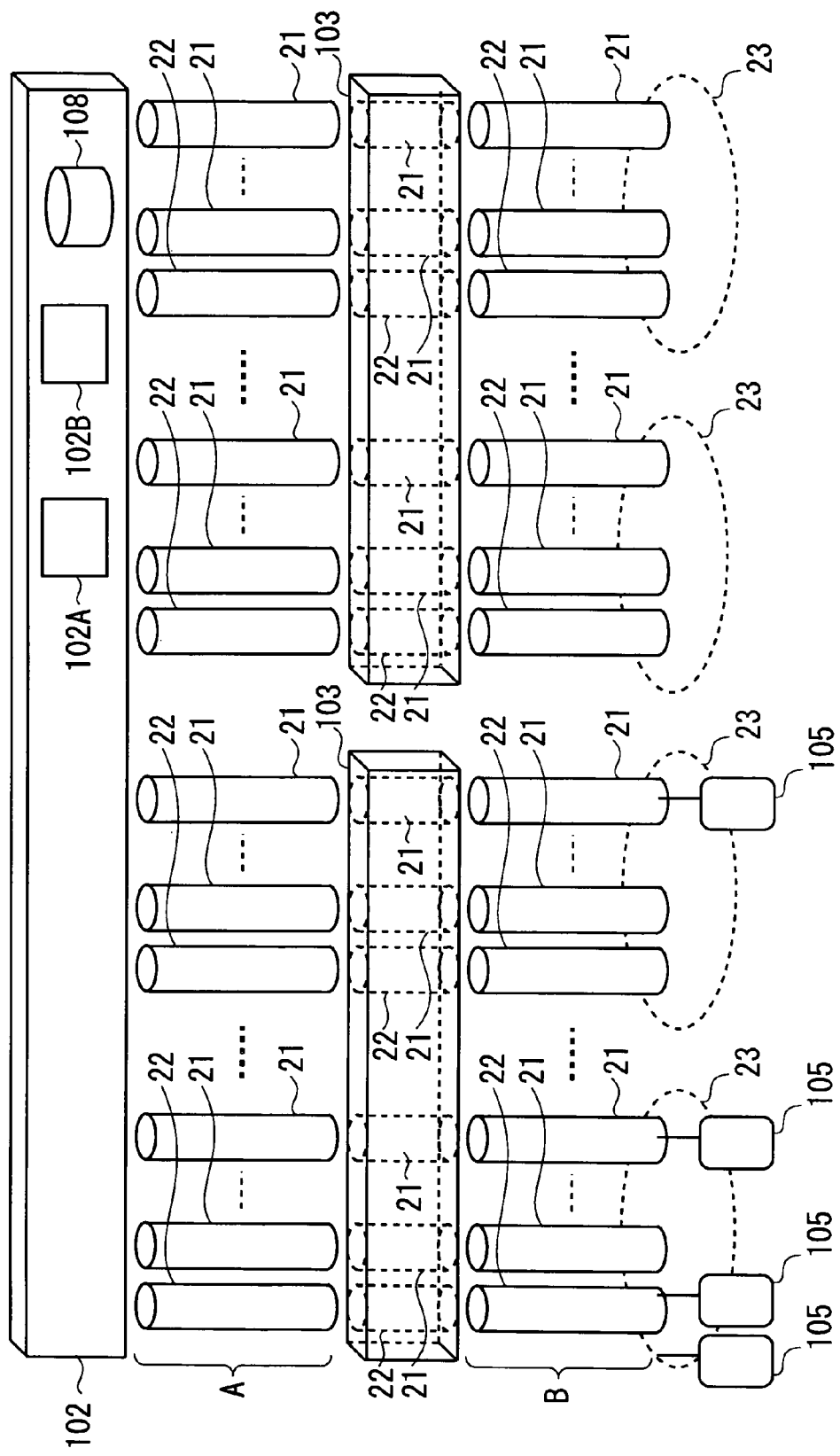
FIG. 2 is a conceptual diagram of individual channels and common channels.

FIG. 2 is a detailed explanatory diagram of concepts of individual channels 21 and common channels 22. Communication channels between the radio network controller 102 and the user equipments 105 include the individual channels 21 and the common channels 22.

The individual channels 21 are communication channels individually assigned to the user equipments 105 and the user equipments 105 are capable of exclusively using the individual channels 21. It is possible to set multiple individual channels 21 for one cell 23. Further, in each cell in which no user equipment 105 exists, physical channels of the individual channels 21 do not exist.

From the viewpoint of effective use of wireless resources, it is required that certain resources of the individual channels be assigned to respective user equipments 105. Therefore, many resources are required. That is, the number of user equipments 105 that can be accommodated in one cell is reduced.

The common channels 22 are communication channels assigned to certain areas (cells) and are commonly usable by multiple user equipments 105. One common channel 22 is set for one cell. The common channels 22 are commonly usable by multiple user equipments 105, so it is possible to accommodate many user equipments in one cell (it is possible to effectively use wireless resources). However, from the viewpoint of a communication rate per user equipment 105, a certain communication band is sharedly used among multiple user equipments 105, so depending on the communication statuses of the user equipments using the same common channel 22, there occurs a case where it is impossible to secure communication rates desired by user equipments that are different from the user equipments.

Further, the communication channels are classified into transport channels (A in FIG. 2)0 set between the radio network controller 102 and the base stations 103 and physical channels (B in FIG. 2) set between the base stations 103 and the user equipments 105. The transport channels include common channels and individual channels. In a like manner, the physical channels include common channels and individual channels. Also in the base stations 103 and the wireless network 102, resources (channels) corresponding to respective communication channels are established. The base stations 103 perform mapping of the transport channels and the physical channels.

Operation Example

Figure 3:
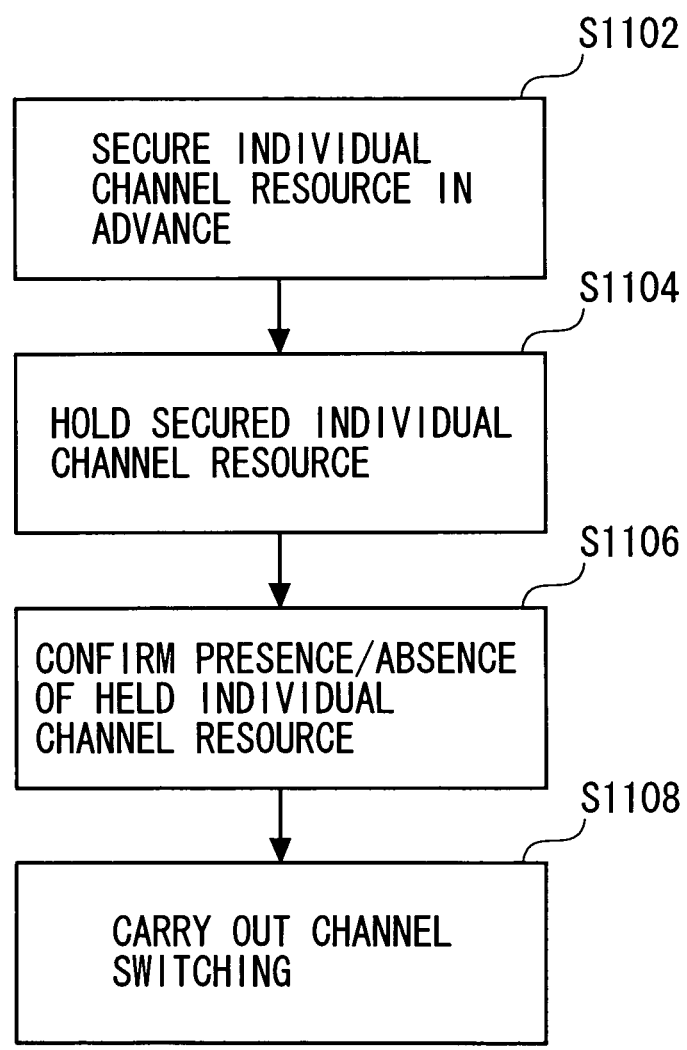
FIG. 3 is a diagram showing an operation flow of channel switching.

FIG. 3 shows an outline of a channel switching method implemented through cooperation between the radio network controller and the base station.

As shown in FIG. 3, the channel switching method includes a step (S1102) of securing an individual channel resource in advance before channel switching from a common channel to an individual channel is carried out, a step (S1104) of holding the secured individual channel resource, a step (S1106) of confirming the presence of the held individual channel resource at the time of execution of the channel switching from a common channel to an individual channel, and a step (S1108) of performing the channel switching using the individual channel resource. Hereinafter, each of these steps will be described in detail.

<Individual Channel Resource Securement>

A method of securing individual channel resources in the radio network controller 102 and the base station 103 in advance before switching control from a common channel to an individual channel is exercised will be described below.

As the method of securing individual channel resources in advance, it is possible to consider a method, with which the individual channel resources are secured at the time of apparatus activation (resumption) of the radio network controller 102 or the base station 103, and a method with which individual channel resources secured at the time of outgoing from the user equipment 105 are secured as they are even after use thereof by the user equipment 105 has been ended. The individual channel resources may be secured in advance with a method other than these methods.

<<Method with which Individual Channel Resources are Secured at the Time of Apparatus Resumption>>

When either of the radio network controller and the base station has been activated (resumed), a sequence for setting a common channel is executed. The common channel is a channel to be set (secured) for a specific cell (area) in advance and is set before the system goes into service. At the time of this common channel setting, an individual channel resource is secured.

Figure 4:
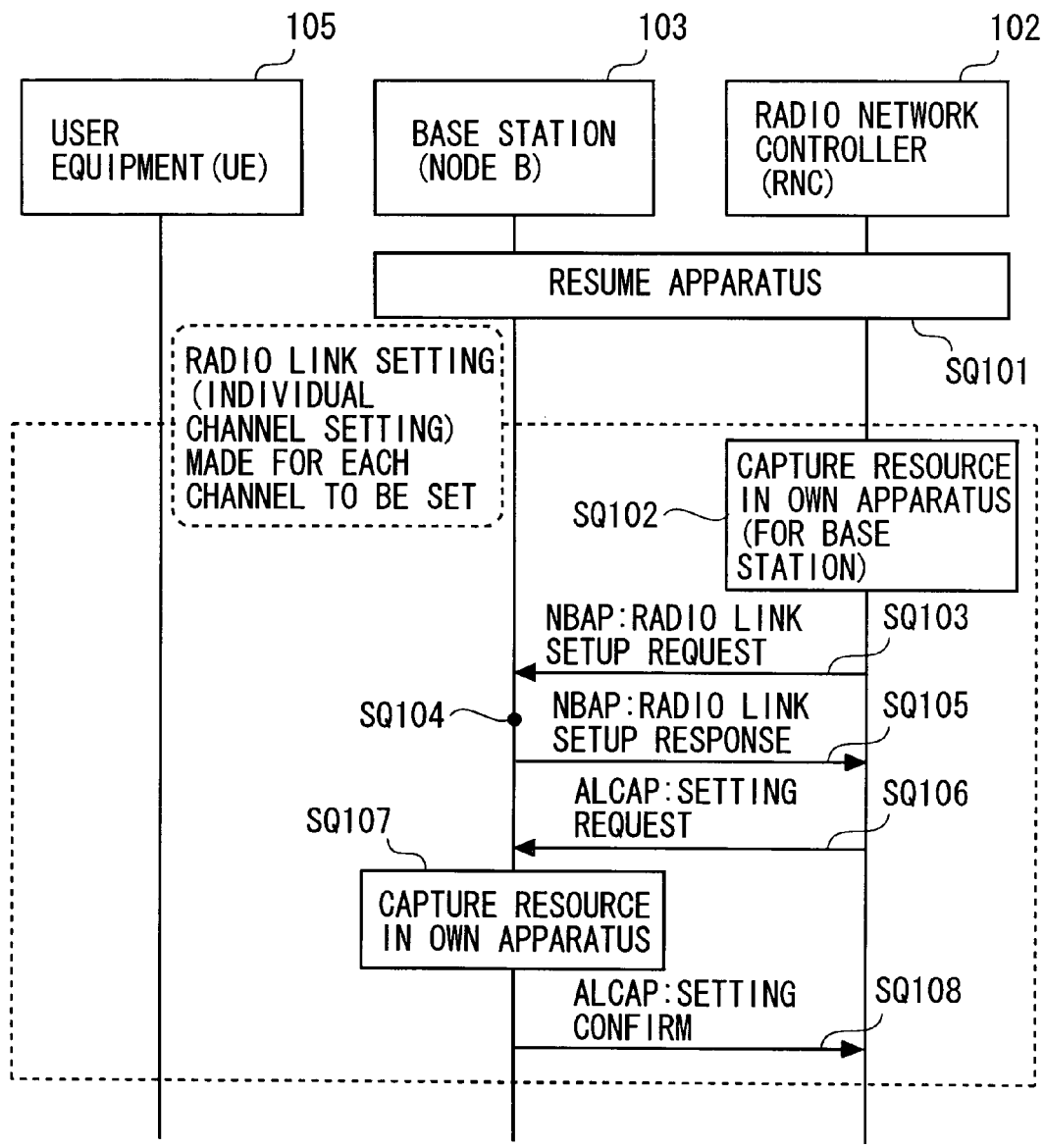
FIG. 4 is a diagram showing an individual channel setting sequence at the time of apparatus resumption of a radio network controller or a base station.

FIG. 4 shows the individual channel setting sequence at the time of the apparatus resumption of the radio network controller 102 or the base station 103. This sequence is repeated the same number of times as the number of individual channels that should be secured in advance. The number of individual channels secured in advance is an arbitrary number that is one or more.

When the radio network controller 102 or the base station 103 has resumed from a hibernation or shutdown state, a setting of a common channel is made (SQ101).

Next, the radio network controller 102 and the base station 103 make a radio link setting (individual channel setting) for each individual channel in the following manner. That is, the radio network controller 102 captures a resource in the radio network controller 102 corresponding to an individual channel that should be set (SQ102).

Next, the radio network controller 102 informs the base station 103 of a radio link setup request (SQ103). On receiving the radio link setup request, the base station 103 secures an individual channel (transport channel) resource and makes a setting of an interface with the user equipment 105 (SQ104).

When the processing in SQ4 is completed, the base station 103 informs the radio network controller 102 of a radio link setup response (SQ105). On receiving the radio link setup response, the radio network controller 102 informs the base station 103 of a line setup request (SQ106). The base station 103 captures an individual channel resource in the base station 103 (SQ107). When the processing in SQ7 is finished, the base station 103 informs the radio network controller 102 of a line resource (individual channel resource) setting confirmation (SQ108).

As a result, in the radio network controller 102, between the radio network controller 102 and the base station 103, and in the base station 103, individual channel resources are secured in advance. Further, it becomes unnecessary to exercise control for securing the individual channel resources and control for deleting the individual channel resources after this, so it becomes possible to simplify the channel switching procedure.

<<Method with which Individual Channel Resources Secured at the Time of Outgoing (Incoming) are Held as they are>>

Alternatively, it is also possible to, at the time of channel switching, hold individual channel resources secured at the time of outgoing/incoming as they are without releasing them.

Through a basic outgoing (or incoming) procedure, not common channels but individual channels are assigned to the user equipment 105. That is, at the time of outgoing/incoming with respect to a certain user equipment, through the same procedure as in the case of the individual channel setting shown in FIG. 4, individual channel resources are secured.

After that, when a communication rate required by the user equipment 105 is below a communication rate that is usable in the individual channels, channel switching control is exercised to effectively use individual channel resources and communication channels assigned to the user equipment 105 are switched from the individual channels to the common channels.

Conventionally, in the channel switching control, processing for releasing the individual channel resources used by the user equipment 105 has been performed. In this embodiment, the release processing is not performed but the individual channel resources on a base station side (in the radio network controller 102, between the radio network controller 102 and the base station 103, and in the base station 103) used by the user equipment before the channel switching are held as they are (note that the individual channels of the physical channels are released).

Note that when the user equipment has moved to a cell that is different from a cell to which the held individual channel resources belong, the held individual channel resources may be released.

<Method of Holding (Managing) Individual Channels>

Next, a method of holding secured individual channel resources will be described.

The individual channel resources on the base station side secured with the method are managed with an individual channel management table created on the storage portion 108 provided for the radio network controller 102, for instance.

FIGS. 5A and 5B each show an example of the individual channel management table. In FIGS. 5A and 5B, individual channel management tables 701 and 702 each store the use states of individual channel resources, base station numbers assigned to base stations holding the individual channel resources, cell numbers assigned to cells in which the individual channel resources are secured, and scramble codes applied to the user equipments 105 that use the individual channel resources.

In a use state column, for each individual channel resource used, the identifier of a user equipment using the individual channel resource is stored. For each individual channel resource not used by any user equipment 105, data showing that the individual channel resource is not used is stored. The scramble codes are codes that are necessary to use individual channels.

With a base station number, a cell number, and a scramble code, it is possible to uniquely identify an individual channel. Note that it is also possible to manage the individual channel resources by giving unique identification codes to the individual channel resources, respectively.

The radio network controller 102 is capable of managing the secured individual channel resources and the user equipments 105 by associating them with each other on a one-to-one basis. When doing so, after channel switching from an individual channel to a common channel has been performed for a certain user equipment 105, when channel switching to an individual channel is performed again for the user equipment 105, the originally used individual channel is used.

When channel switching from a common channel to an individual channel is performed, an individual channel associated with a user equipment is held, so there is no necessity to search for a switching destination individual channel. Therefore, channel switching in a shorter time becomes possible.

In the case of the individual channel management table 702 shown in FIG. 5B, it is possible to describe and store identifiers of user equipments associated with individual channels as use user equipments.

Figure 6A:
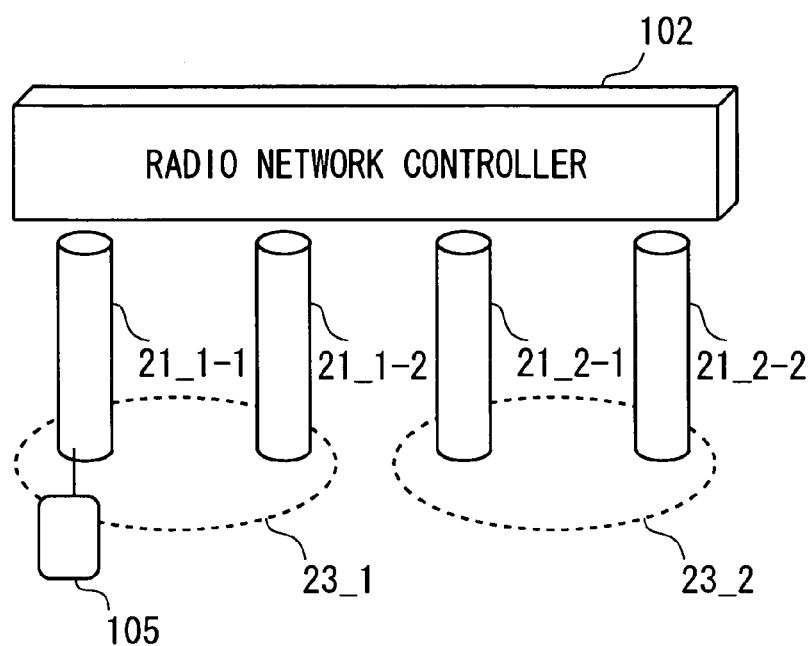
FIG. 6A is a diagram showing a correspondence between a user equipment and an individual channel.
Figure 6B:
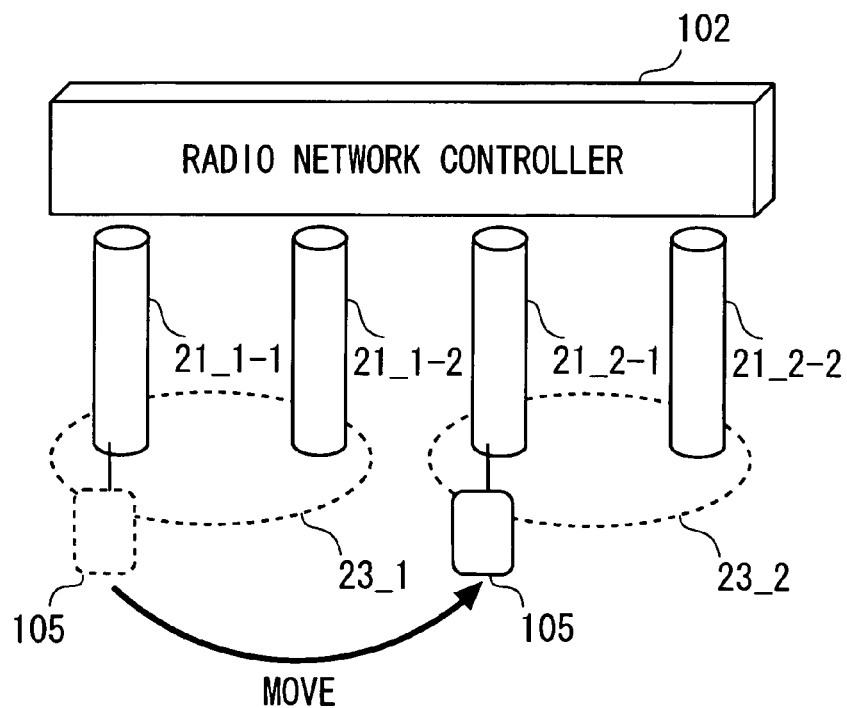
FIG. 6B is a diagram showing a correspondence between the user equipment and an individual channel.

FIGS. 6A and 6B each show an example of an association between a user equipment and an individual channel. The user equipment 105 is associated with an individual channel 21_1-1 of a cell 23_1 (FIG. 6A). When the user equipment 105 has moved from the cell 23_1 to a cell 23_2, the individual channel 21_1-1 secured in the cell 23_1 is released and an individual channel 21_2-1 of the cell 23_2 is secured newly (FIG. 6B).

Alternatively, the radio network controller 102 is also capable of conducting the management without associating the secured individual channel and the user equipment 105 with each other on a one-to-one basis. In this case, the radio network controller 102 manages information about the secured individual channel and information about a cell, in which the user equipment 105 exists, separately from each other. In this case, the user equipment 105 and the individual channel are not associated with each other on a one-to-one basis, so when the individual channel is assigned to the user equipment 105, it is required to judge whether an individual channel resource to be assigned is held.

<Channel Switching>

When a data transfer rate between the user equipment 105 using a common channel and the radio network controller 102 has increased and an occupancy rate in the common channel has exceeded a predetermined threshold value, the channel switching judgment portion 102A of the radio network controller 102 judges that it is possible to transfer data with more efficiency using an individual channel instead of the common channel. Next, the radio network controller 102 secures an individual channel for the user equipment 105 and carries out channel switching from the common channel to the individual channel.

Figure 7:
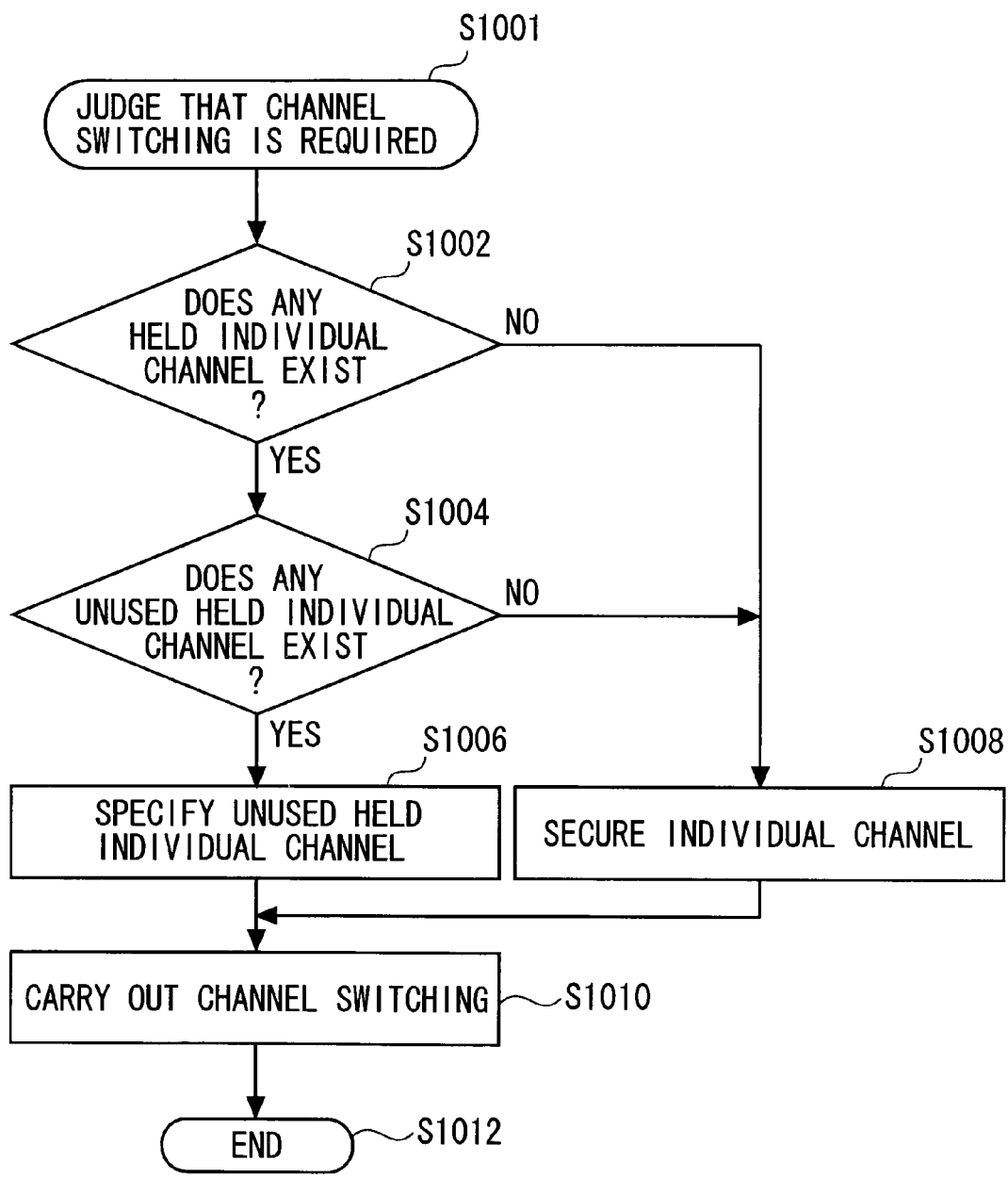
FIG. 7 is a diagram showing an operation flow of channel switching.

FIG. 7 shows an operation flow of the channel switching from a common channel to an individual channel. The flowchart shown in FIG. 7 is started when the wireless network control portion 102 has found as a result of monitoring of a data transfer rate of the user equipment 105 using a common channel that the data transfer rate has exceeded a predetermined threshold value, for instance. In this case, the channel switching judgment portion of the radio network controller 102 judges that it is required to switch a communication channel assigned to the user equipment 105 from the common channel to an individual channel (S1001).

Next, the channel switching portion 102B of the radio network controller 102 refers to the individual channel management table 700 stored in the storage portion 108 and judges whether there exist any individual channels secured and held in advance (S1002). When there exist any individual channels 21 secured and held in advance (S1002; YES), the channel switching portion 102B judges whether there exists any unused individual channel (S1004).

When there exists any unused individual channel (S1004; YES), the channel switching portion 102B sets the unused individual channel as a switching destination individual channel (when there exist multiple unused individual channels, one of the unused individual channels) is set as the switching destination individual channel and designates the individual channel as a use channel for the base station 103. When there exists no individual channel secured in advance (S1002; NO) or when there exists no unused individual channel (S1004; NO), the channel switching portion 102B secures an individual channel to be used by the user equipment 102 (S1008). Following this, the channel switching portion 102B carries out channel switching by cooperating with the base station 103 (S1010). When the channel switching (S1010) is completed, the channel switching processing shown in FIG. 7 is ended.

<<Case where Held Individual Channel Exists>>

Figure 8:
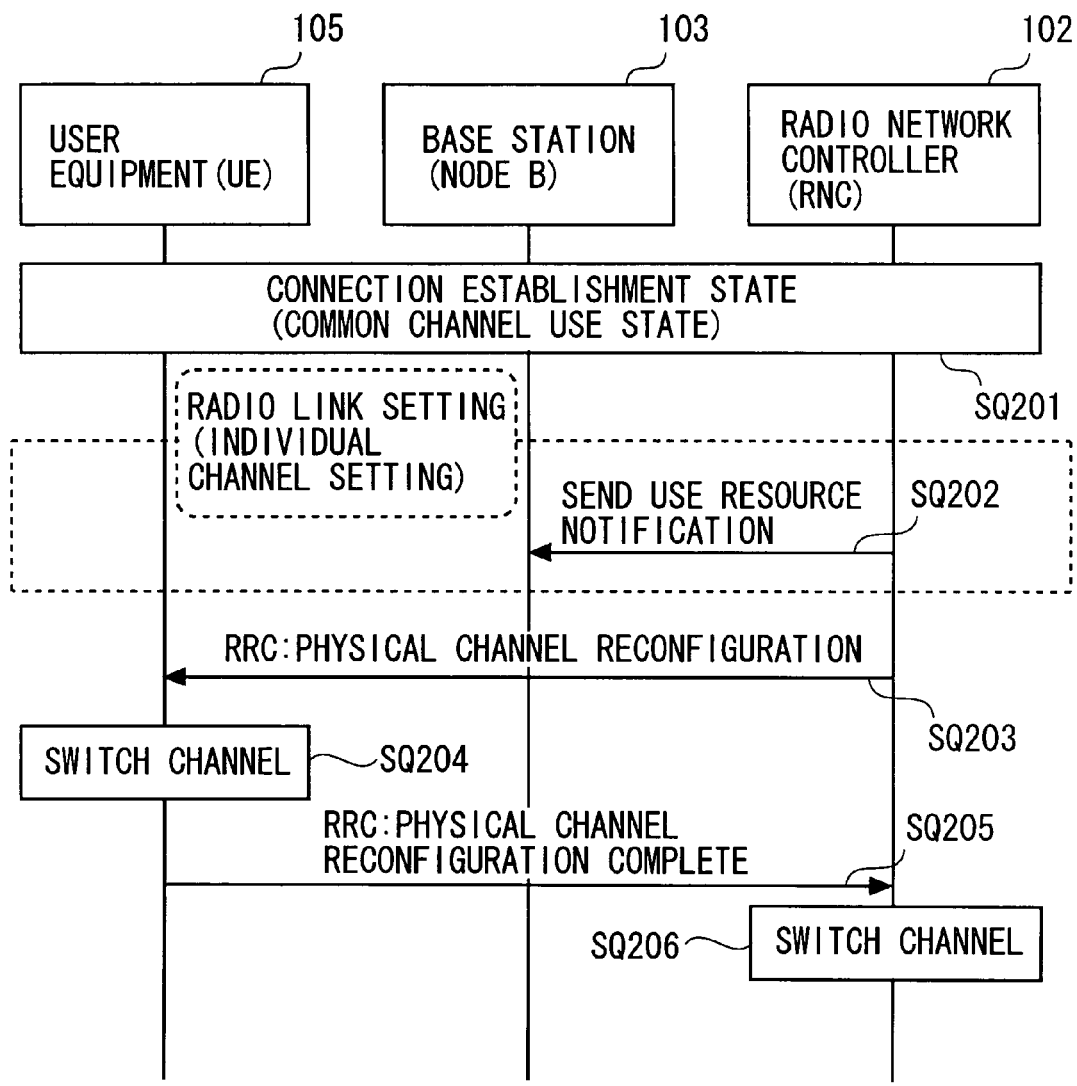
FIG. 8 is a diagram showing a channel switching sequence in the case where an individual channel is held.

FIG. 8 shows an example of a processing sequence at the time of the channel switching in the case where any unused held individual channel exists (details of S1010 in FIG. 7).

The radio network controller 102 specifies an unused individual channel resource held in advance and informs the base station 103 of the specified individual channel resource (SQ202: S1006 in FIG. 7). The base station 103 assigns the specified individual channel resource to the user equipment 105. As a result, an individual channel resource secured and held in advance is placed under a state under which it is usable between the radio network controller 102 and the user equipment 105.

The radio network controller 102 informs the user equipment 105 of "physical channel reconfiguration (RRC)" (SQ203). As a result, it becomes possible to open a wireless interface between the base station 103 and the user equipment 105. The user equipment 105 switches the physical channel from a common channel to an individual channel (SQ204).

Following this, the user equipment 105 informs the radio network controller 102 of "physical channel reconfiguration complete (RRC)". The radio network controller 102 switches the transport channel (channel on the base station side) for the user equipment 105 from a common channel to an individual channel (SQ206).

According to the sequence shown in FIG. 8, the channel switching procedure is executed using an individual channel resource secured and held in advance, so an individual channel securement procedure becomes unnecessary, which makes it possible to shorten a time of channel switching.

Alternatively, it is also possible to assign the held individual channel resource as an individual channel to be assigned initially at the time of outgoing or incoming of the user equipment 105. As a result, an individual channel securement operation becomes unnecessary at the time of the outgoing or the incoming.

<<Case where Held Individual Channel Exists>>

Figure 9:
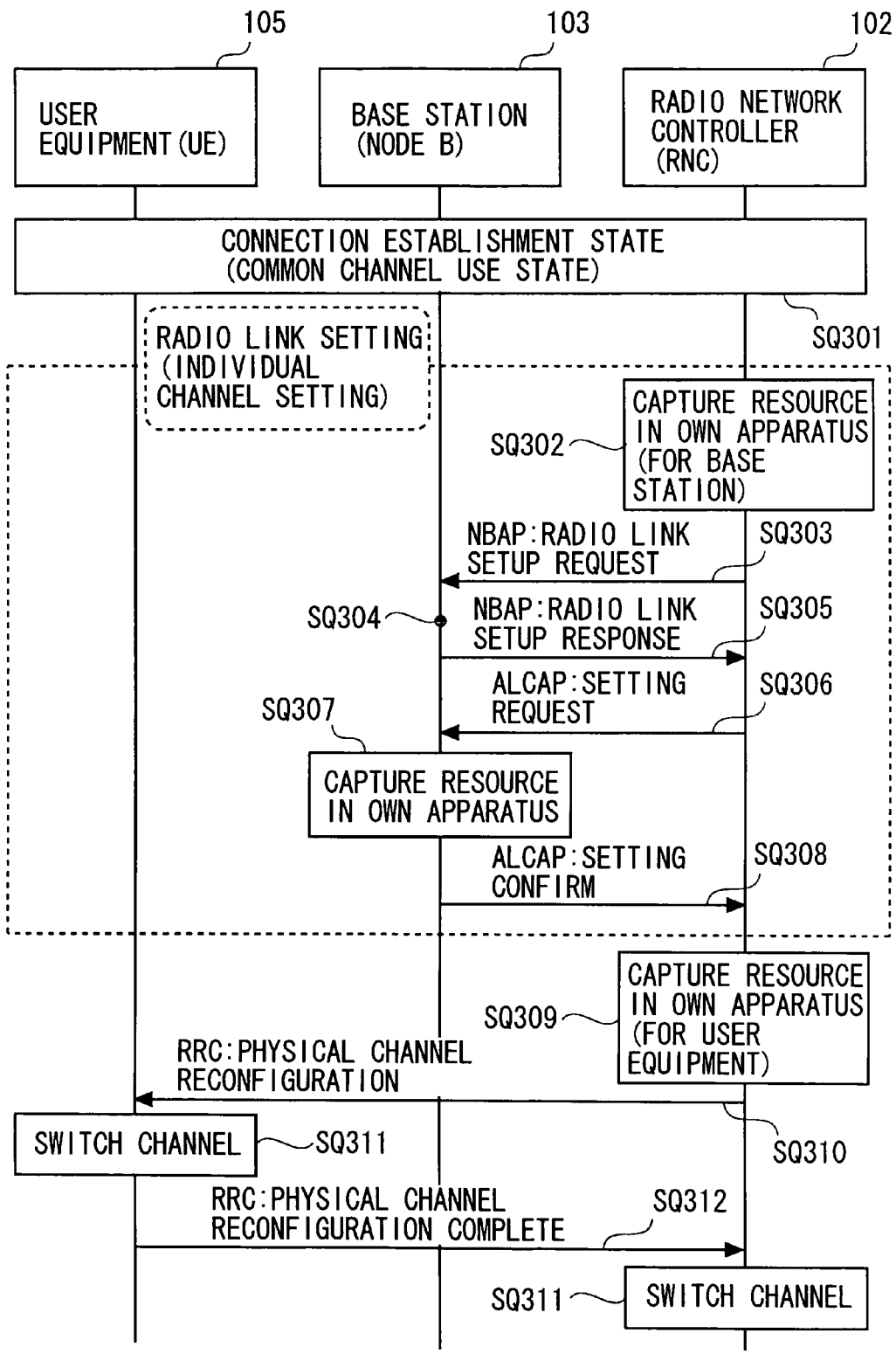
FIG. 9 is a diagram showing a processing sequence example at the time of channel switching.

FIG. 9 shows an example of a processing sequence at the time of the channel switching in the case where any unused held individual channel does not exist.

The radio network controller 102 captures a resource to be assigned to an individual channel of a user equipment in the radio network controller (SQ302).

The radio network controller 102 informs the base station 103 of a "radio link setup request (NBAP)" in order to secure an individual channel resource (SQ303).

The base station 103 secures an individual channel resource in the base station and makes a setting of an interface with the user equipment (SQ304). When the resource securement ends in success, the base station 103 informs the radio network controller 102 of a "radio link setup response (NBAP)" (SQ305).

The radio network controller 102 informs the base station 103 of an "establish request (ALCAP)" in order to establish a line (SQ306). As a result, a resource on a line between the radio network controller 102 and the base station 103 is secured. The base station 103 captures a resource in the base station (SQ307).

The base station 103 informs the radio network controller 102 of "establish confirm (ALCAP)" for confirmation of the establishment of the line resource (SQ308). As a result, an individual channel is set.

The radio network controller 102 secures a resource for switching a channel with the user equipment 105 in the radio network controller (SQ309).

The radio network controller 102 informs the user equipment 105 of "physical channel reconfiguration (RRC)" (SQ310). As a result, it becomes possible to open a wireless interface between the base station 103 and the user equipment 105 set in advance.

The user equipment 105 performs channel switching from a common channel to the secured individual channel (SQ311). The user equipment 105 informs the radio network controller 102 of "physical channel reconfiguration complete (RRC)" (SQ312).

The procedure is the same procedure as the channel switching procedure adopted in the conventional technique.

<Release of Individual Channel>

A procedure for releasing an individual channel used by a user equipment when channel switching from the individual channel to a common channel is performed, when communication is ended, or the like will be described.

<<Case of Held Individual Channel>>

Figure 10:
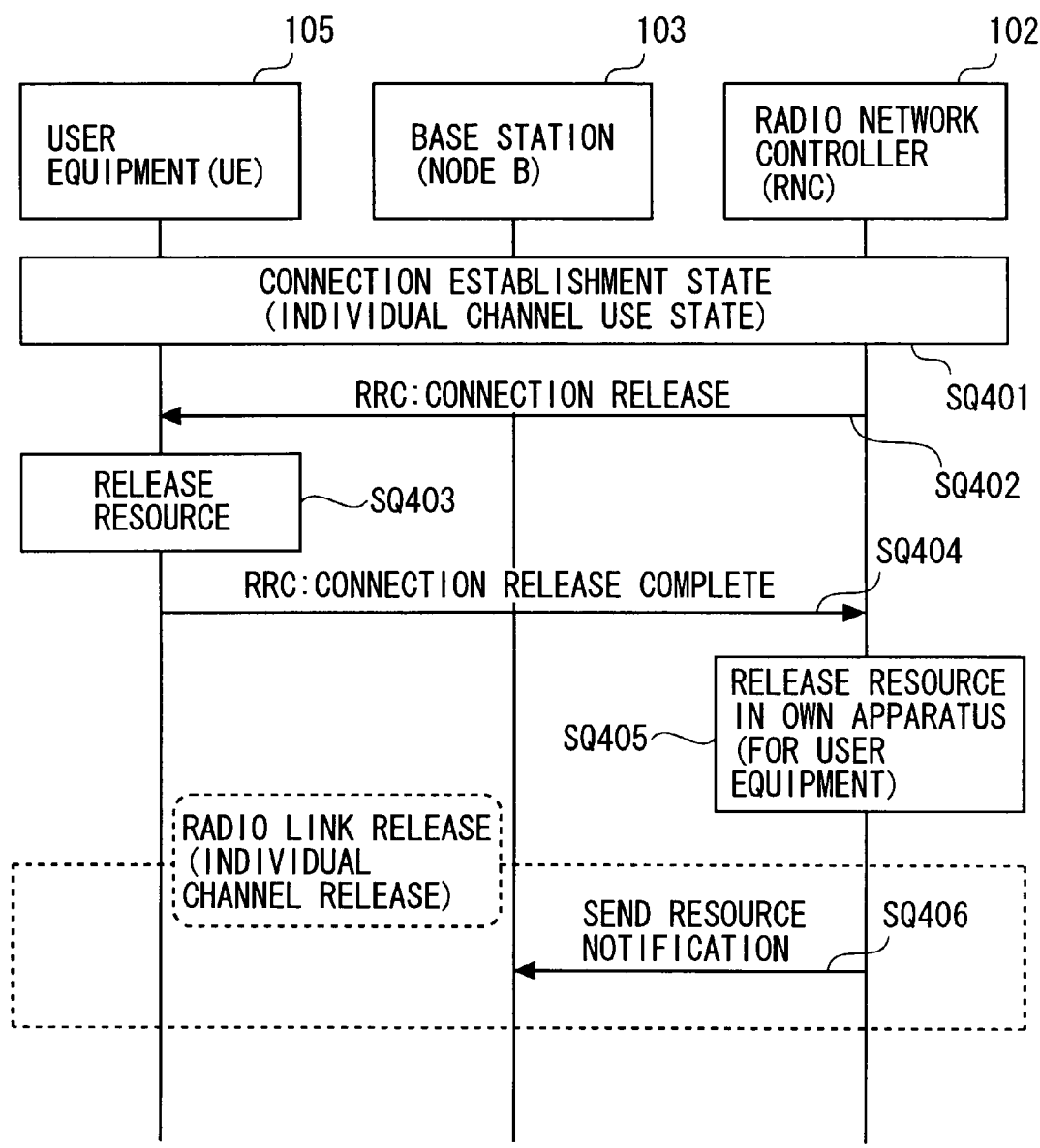
FIG. 10 is a diagram showing a sequence for releasing a held individual channel.

FIG. 10 shows a sequence for releasing a held individual channel. In FIG. 10, the radio network controller 102 informs the user equipment 105 of "connection release (RRC)" (SQ402). The user equipment 105 releases the resource of a physical channel (individual channel) that it uses (SQ403).

When the resource release is completed, the user equipment 105 informs the radio network controller 102 of "connection release complete (RRC)" (SQ404). The radio network controller 102 releases an individual channel resource assigned to the user equipment 105 in the radio network controller (SQ405). Following this, the radio network controller 102 informs the base station 103 of a resource whose use is to be stopped (SQ406). On being informed, the base station 103 places a corresponding individual channel resource under an unused state. The radio network controller 102 manages the resource as an unused resource.

<<Case Other than Held Individual Channel>>

Figure 11:
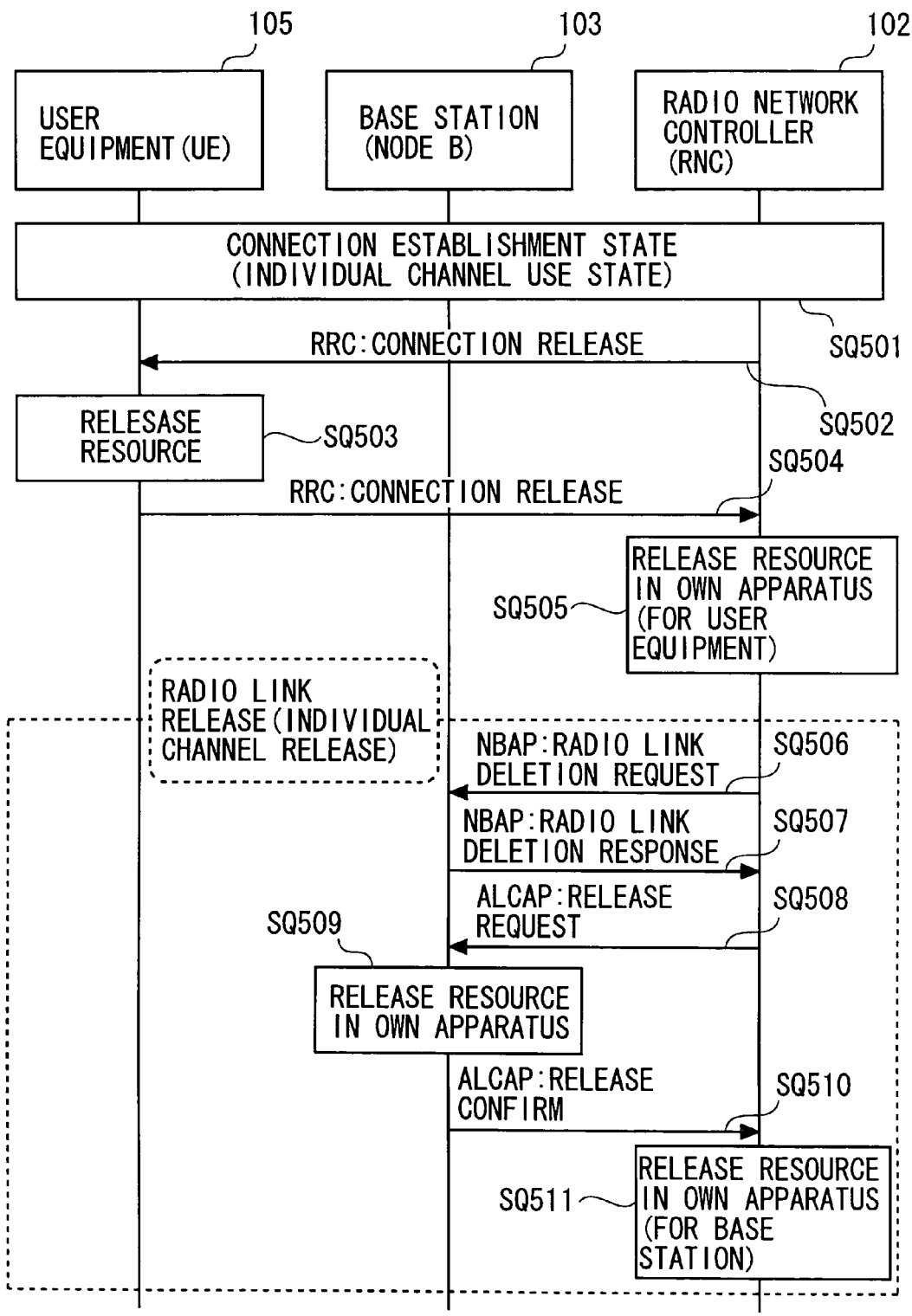
FIG. 11 is a diagram showing a sequence for releasing an individual channel.

FIG. 11 shows a sequence for releasing a held individual channel. In FIG. 11, the radio network controller 102 informs the user equipment 105 of "connection release (RRC)" (SQ502). The user equipment 105 releases the resource of a physical channel that it uses (SQ503). The user equipment 105 informs the radio network controller 102 of "connection release complete (RRC)" (SQ504).

The radio network controller 102 informs the base station 103 of a "radio link deletion request (NBAP)" (SQ506). The base station 103 deletes securement of an individual channel resource and a setting of an interface with the user equipment. The base station 103 informs the radio network controller 102 of a "radio link deletion response (NBAP)" (SQ507).

The radio network controller 102 informs the base station 103 of a "release request (ALCAP)" (SQ508). The base station 103 releases a resource in the base station (SQ509). The base station 103 informs the radio network controller of "release confirm (ALCAP)" for confirmation of the release of the resource (SQ510). The radio network controller 102 releases a resource in the radio network controller (SQ511).

The processing shown in FIG. 11 is the same as the individual channel release sequence used in the conventional technique.

Effect of the Embodiment

According to the embodiment, an individual channel resource on the base station side (in the radio network controller 102, between the radio network controller 102 and the base station 103, and in the base station 103) that should be assigned to the user equipment 105 is secured and held in advance before channel switching.

Following this, when there occurs a necessity of channel switching to an individual channel for a certain user equipment 105, the radio network controller 102 performs the channel switching using the individual channel resource secured and held in advance. As a result, a time required for the channel switching is shortened by a time of the individual channel resource securement. Further, procedure for securing the individual channel resource is omitted in the channel switching processing, so a load of the channel switching processing is alleviated. As a result, it becomes possible to perform the channel switching with efficiency as compared with the conventional case and it becomes possible to achieve an improvement in communication quality.

Further, individual channel resources and the user equipments 105 are managed in association with each other, so when an individual channel resource under a vacant state generated at the time of channel switching from an individual channel to a common channel for a certain user equipment 105 is held without being released and then an individual channel is assigned to the certain user equipment 105 again, a necessity to search for an individual channel resource to be assigned to the user equipment 105 is eliminated, thereby enabling smooth channel switching.

Further, in processing for releasing an individual channel secured and held in advance, processing for releasing an individual channel resource on the base station side is not performed and the individual channel resource is merely placed under an unused state, so it becomes possible to achieve shortening and simplification of processing.

Still further, it is possible to realize the procedure for securing individual channel resources in advance by omitting a procedure for setting physical channels for the user equipments 105 from a procedure executed at the time of an ordinary individual channel setting and it is possible to realize the individual channel release processing by omitting processing for releasing individual channel resources on the base station side from ordinary individual channel release processing. That is, it is possible to realize the channel switching method according to the present invention without making significant alterations to the conventional construction and procedure.

INCORPORATION BY REFERENCE

The disclosures of Japanese patent application, No. JP2006-076694 filed on Mar. 20, 2006 including the specification, drawings and abstract are incorporated by reference.

What is claimed is:

1. A radio network controller for assigning, to each wireless terminal connected to a wireless network, one of an individual channel exclusively used by a wireless terminal and a common channel shared with at least one wireless terminal different from the wireless terminal as a communication channel, the radio network controller comprising:
- a securement unit configured to secure an individual channel resource for assigning the individual channel to the wireless terminal, to store a scramble code applied to the wireless terminal that uses the individual channel resources, before the wireless terminal is connected to the wireless network, even when there exists no wireless terminal to which the individual channel should be assigned, and to secure, when switching from an individual channel to a common channel has been carried out for a certain wireless terminal, an individual channel resource used by the certain wireless terminal without releasing the individual channel resource,
- a pre-storage unit configured to prestore identification information of the individual channel resource secured by the securement unit in an undetermined state before determining that the individual channel is to be assigned to the wireless terminal,
- a determination unit configured to determine that the individual channel is to be assigned to the wireless terminal;
- an assignment unit, when an assignment of the individual channel has been determined, configured to assign the individual channel of a secured individual channel resource before the determination by the determination unit to the wireless terminal, and
- a storage unit configured to store the certain wireless terminal and the individual channel resource used by the certain wireless terminal in association with each other,
- wherein, when the determination unit determines that a communication channel used by the certain wireless terminal is to be switched from a common channel to an individual channel again, the assignment unit refers to the storage unit and assigns the individual channel resource originally used by the certain wireless terminal.

2. The radio network controller according to claim 1, wherein when the determination unit has determined that a communication channel used by a wireless terminal is to be switched from a common channel to an individual channel, the assignment unit assigns the individual channel of the secured individual channel resource before the determination of the switching to the wireless terminal.

3. The radio network controller according to claim 1, wherein the assignment unit finds an unused individual channel resource from the storage unit and assigns the found individual channel resource to a wireless terminal.

4. The radio network controller according to claim 1, wherein the securement unit secures the individual channel resource at the time of activation of the radio network controller.

5. The radio network controller according to claim claim 1, wherein the individual channel resource used by the certain wireless terminal is released when the certain wireless terminal moves to a wireless area that is different from a wireless area in which the certain wireless terminal is capable of using the individual channel resource.

6. The radio network controller according to claim 1, wherein at a time of outgoing from a wireless terminal or incoming to the wireless terminal, when the determination unit determines that an individual channel is to be assigned to the wireless terminal that is an outgoing terminal or an incoming terminal, the assignment unit assigns the individual channel of the individual channel resource before the determination to the wireless terminal.

7. The radio network controller according to claim 1, wherein the storage unit stores the identification information of the secured individual channel resource associated with the wireless terminal.

8. A channel assignment method by a radio network controller for assigning, to each wireless terminal connected to a wireless network, one of an individual channel exclusively used by a wireless terminal and a common channel shared with at least one wireless terminal different from the wireless terminal as a communication channel, the channel assignment method by the radio network controller comprising:
- securing an individual channel resource for assigning the individual channel to the wireless terminal, and storing a scramble code applied to the wireless terminal that uses the individual channel resources, before the wireless terminal is connected to the wireless network, even when the wireless terminal to which the individual channel should be assigned does not exist;
- prestoring identification information of the individual channel resource secured before determining that the individual channel is to be assigned to the wireless terminal;
- determining that the individual channel is to be assigned to the wireless terminal; assigning, when an assignment of the individual channel is determined, the individual channel of a secured individual channel resource before the determination to the wireless terminal,
- securing, when switching from an individual channel to a common channel is carried out for a certain wireless terminal, an individual channel resource used by the certain wireless terminal without releasing the individual channel resource,
- storing the certain wireless terminal and the individual channel resource used by the certain wireless terminal in association with each other, and
- referring, when it is determined that a communication channel used by the certain wireless terminal is to be switched from a common channel to an individual channel again, to associations among identification information of the secured individual channel resource, a use state thereof, and the individual channel resource used by the certain wireless terminal and assigning the individual channel resource originally used by the certain wireless terminal.

9. The channel assignment method by a radio network controller according to claim 8, further comprising:
- assigning, when it is determined that a communication channel used by a wireless terminal is to be switched from a common channel to an individual channel, the individual channel of the secured individual channel resource before the determination of the switching to the wireless terminal.

10. The channel assignment method by a radio network controller according to claim 8, further comprising:
- finding an unused individual channel resource with reference to the identification information of the secured and held individual channel resource and the use state thereof and assigning the found individual channel resource to the wireless terminal.

11. The channel assignment method by a radio network controller according to claim 8, further comprising:
- securing the individual channel resource at a time of activation of the radio network controller.

12. The channel assignment method by a radio network controller according to claim 8, further comprising:
- releasing the individual channel resource used by the certain wireless terminal when the certain wireless terminal moves to a wireless area that is different from a wireless area in which the certain wireless terminal is capable of using the individual channel resource.

13. The channel assignment method by a radio network controller according to claim 8, further comprising:

assigning, at a time of outgoing from a wireless terminal or incoming to the wireless terminal, when it has been determined that an individual channel is to be assigned to the wireless terminal that is an outgoing terminal or an incoming terminal, the individual channel of the secured individual channel resource before the determination to the wireless terminal.

14. The channel assignment method by a radio network controller according to claim 8, further comprising:

storing the identification information of the secured individual channel resource associated with the wireless terminal.

* * * * *